United States Patent
Scheffer et al.

(10) Patent No.: US 10,443,293 B2
(45) Date of Patent: Oct. 15, 2019

(54) DOOR SYSTEM WITH SENSOR UNIT FOR CONTACTLESS PASSENGER COMPARTMENT MONITORING

(71) Applicant: Gebr. Bode GmbH & Co. KG, Kassel (DE)

(72) Inventors: Benjamin Scheffer, Kassel (DE); Alfons Harding, Borchen (DE)

(73) Assignee: GEBR. BODE GMBH & CO. KG, Kassel (DE)

( * ) Notice: Subject to any disclaimer, the term of this patent is extended or adjusted under 35 U.S.C. 154(b) by 197 days.

(21) Appl. No.: 15/512,664

(22) PCT Filed: Sep. 17, 2015

(86) PCT No.: PCT/EP2015/071320
§ 371 (c)(1),
(2) Date: Mar. 20, 2017

(87) PCT Pub. No.: WO2016/042074
PCT Pub. Date: Mar. 24, 2016

(65) Prior Publication Data
US 2017/0292314 A1    Oct. 12, 2017

(30) Foreign Application Priority Data
Sep. 19, 2014   (DE) .................. 10 2014 113 567

(51) Int. Cl.
*E05F 15/73*    (2015.01)
*B61D 19/00*    (2006.01)
(Continued)

(52) U.S. Cl.
CPC ............. *E05F 15/73* (2015.01); *B61D 19/00* (2013.01); *B61L 15/0081* (2013.01);
(Continued)

(58) Field of Classification Search
CPC .... E05F 15/73; E05Y 2900/132; G01S 7/527; G01S 15/04
(Continued)

(56) References Cited

U.S. PATENT DOCUMENTS 5,176,082 A * 1/1993 Chun ................... B61B 1/02
  104/28
5,347,755 A * 9/1994 Jaster ................... E05F 1/046
  49/25
(Continued)

FOREIGN PATENT DOCUMENTS

| CN | 1398230 A | 2/2003 |
| FR | 2734644 A1 | 11/1996 |
| WO | 0244505 A1 | 6/2002 |

OTHER PUBLICATIONS

"Safety Sensor for External Railway Doors", Oct. 1, 2011, pp. 3, 5, 7, 9, and 11 XP05523645, URL:http://www.sensorio.be/uploads/docs/manuals/ug_lzr-rs30_en_v3.pdf.
(Continued)

*Primary Examiner* — Chi Q Nguyen
(74) *Attorney, Agent, or Firm* — Cantor Colburn LLP

(57) ABSTRACT

A door system for a public transit vehicle includes at least one door opening and a door that closes this door opening, wherein a sensor unit performs three-dimensional and touch-free scanning of a passenger compartment in the area of the door opening. A process of monitoring and controlling such a door system includes the steps of touch-free and three-dimensional scanning of a passenger compartment in the area of a door opening with a sensor unit, and measuring distances, shapes, and movements of objects by evaluating the readings from touch-free and three-dimensional scanning.

13 Claims, 2 Drawing Sheets

(51) Int. Cl.
  B61L 15/00 (2006.01)
  E05F 15/00 (2015.01)
  E05F 15/43 (2015.01)
  B61D 19/02 (2006.01)

(52) U.S. Cl.
  CPC .............. E05F 15/00 (2013.01); E05F 15/43 (2015.01); *B61D 19/02* (2013.01); *E05F 2015/765* (2015.01); *E05Y 2400/852* (2013.01); *E05Y 2400/86* (2013.01); *E05Y 2900/51* (2013.01)

(58) Field of Classification Search
  USPC .................. 340/5.7, 5.72; 49/31, 28, 26, 27; 318/264, 265, 272, 275, 277, 282
  See application file for complete search history.

(56) References Cited

U.S. PATENT DOCUMENTS

| | | | | |
|---|---|---|---|---|
| 5,410,149 A | * | 4/1995 | Winston, Jr. ............ | B66B 13/26 250/221 |
| 5,422,552 A | * | 6/1995 | Parisi .................... | E05F 15/652 318/466 |
| 5,936,232 A | * | 8/1999 | Saretzky ................. | G01V 8/12 105/341 |
| 5,963,000 A | * | 10/1999 | Tsutsumi ................ | E05F 15/73 250/221 |
| 5,996,281 A | * | 12/1999 | Takano .................... | G01V 8/14 49/26 |
| 6,341,563 B1 | | 1/2002 | Gal et al. | |
| 6,344,642 B1 | * | 2/2002 | Agam ..................... | G01S 15/46 250/221 |
| 6,386,326 B2 | * | 5/2002 | Pustelniak .............. | B66B 13/26 187/317 |
| 6,495,933 B2 | * | 12/2002 | Tokuda ................ | B61D 23/025 105/426 |
| 6,782,660 B2 | * | 8/2004 | Takada .................... | E05F 15/74 49/25 |
| 6,970,085 B2 | * | 11/2005 | Okabe ..................... | E05F 15/43 340/480 |
| 2010/0319256 A1 | * | 12/2010 | Agam ..................... | G01S 15/04 49/31 |

OTHER PUBLICATIONS

"Sensing Success" Railway Strategies, Feb. 17, 2014, whole document; XP055236551, URL:http://www.railwaystrategies.co.uk/article-page.php?contentid=19393&issueid=547.
Bea Industrial: BEA Sensorio—Actualités—Infos récentes—The Stadler GTW train platforms equippped with LZR-RS300:, Sep. 15, 2010, whole document, URL:http://www.sensorio.be/fr/news/latests-news /LZR-RS300-stadler-gwt-train-platform/.
International Search Report dated Jan. 5, 2016 re: Application No. PCT/EP2015/071320, pp. 1-3, "Sensing Success", "Safety Sensor . . . ", WO 02/44505 A1, FR 2 34 644 A1, US 6 341 563 B1, "Bea Sensorio . . . " and US 2013/125468 A1.

* cited by examiner

DOOR SYSTEM WITH SENSOR UNIT FOR CONTACTLESS PASSENGER COMPARTMENT MONITORING

TECHNICAL FIELD

The present disclosure relates to a door system for a public transit vehicle with at least one door opening and a door closing the door opening. The disclosure further relates to a process for monitoring and controlling such a door system.

BACKGROUND

Door systems are used in particular in rail and road vehicles, but also in boats and on aeroplanes. Such door systems are monitored in many respects and controlled depending on a large variety of conditions. On the one hand, the safety of boarding and de-boarding passengers must always be safeguarded, on the other hand, doors and door wings must open and close reliably and only under certain circumstances. It must also be prevented that persons or objects are trapped between two door wings or between a door wing and a door frame. In addition, in public transit vehicles, passengers must often have an opportunity to open a door by operating a switch or button. At the same time, it must be ensured that such buttons do not start an opening process in every situation, i.e. for example that the door remains closed while the vehicle is moving.

In accordance with the disclosure, the term "door systems" also includes boarding aids such as sliding treads and tread steps. Their function must also be monitored and controlled, since for example, local conditions can change. For example, platforms at different stations can be at a different distance from the door openings, which means that boarding aids must be folded out differently. It is also to be ensured that no persons or objects are trapped between a boarding aid and the platform and that the boarding aid does not bump against persons.

For these numerous monitoring and control tasks, a variety of sensor means are used in door systems, such as:
1. Various push buttons for operating the door.
2. Push bars/switch rails for recognizing obstacles. These are mostly installed in a main closing edge, either alone or also additionally in secondary closing edges inside the doors or door wings.
3. Light barriers inside the vehicle to hold open doors being used (for controlling automatically closing doors).
4. Step sensors (safety mats, strain gauges or such) to recognize loads on treads and boarding aids.
5. Power bars on step systems to recognize collisions with the platform or with passengers when steps are being extended.
6. Ultrasound sensors in step systems for measuring the distance to the platform and also the platform height.
7.

The above named sensor systems require numerous components, sophisticated cabling and careful maintenance and upkeep. It is therefore necessary but also relatively expensive to completely monitor and satisfactorily control a door system.

SUMMARY

The disclosure provides a door system in which the above named monitoring and control tasks can be performed reasonably economically. Installation, maintenance, and upkeep are to be as simple and low-cost as possible. In particular, the number of necessary components is to be reduced. The disclosure also provides an appropriate process for monitoring and controlling such a door system.

According to the disclosure, a door system for a public transit vehicle is provided having at least one door opening and a door that closes the opening, wherein a sensor unit scans a passenger compartment in three dimensions and is touch-free.

Accordingly, the door system comprises a sensor unit, which scans a passenger compartment in the vicinity of the door opening in three dimensions and touch-free.

The process for monitoring and controlling a door system of a public transit vehicle comprises the following process steps:
- Touch-free and three-dimensional scanning of a passenger compartment in the vicinity of the doorway with a sensor unit;
- Determining distances, shapes and the movement of objects by evaluating the readings from touch-free and three-dimensional scanning, Accordingly, the passenger compartment or boarding space is covered or scanned in three dimensions by means of a sensor unit inside and/or outside the vehicle. This three-dimensional scanning can be performed on the basis of known optical systems such as infrared sensors, infrared laser scanners, or suitable camera systems with optical image analysis; ultrasound scanning is also a possible alternative. The collected data can be used to test possible collisions between door systems and step systems and their surroundings or with passengers. Previously defined points in the space can be used as virtual buttons for controlling the door and step systems.

3

Advantageously, the door system can comprise a communication element for a context-based communication with passengers on the basis of readings from the sensor unit. Particularly suitable communication elements are speakers, monitors or lights. There may be only a single communication element, but alternatively, several different elements can be used at the same time. In a particularly simple version, a light can signal with the colours of red and green whether a door is being opened or not. In case of more extensive information, speakers or monitors may be better suited. The communication elements are preferably placed directly in the area of the door opening.

Below, the disclosure is being described substantially as an example for how the laser scanner unit is being used. However, instead of the laser scanner unit, the above named alternative sensor units can be used as well. In particular, in the case of explanations relating to spatial conditions and an evaluation of the scanner results, the type of sensor really does not matter, and in such a case, the term "laser scanner unit" can be regarded as a synonym for all suitable sensors.

In a particularly advantageous embodiment, the sensor unit is formed by a laser scanner unit placed in the area of the door opening. The laser scanner unit generates a kind of point cloud via which the passenger compartment is scanned in all three dimensions, i.e. in directions x, y and z. Preferably, the laser scanner unit uses infrared light which is invisible to the human eye. With the help of the transmitted point cloud, a distance measurement is conducted based on the so-called time-of-flight (ToF) principle. It means that the laser scanner emits light pulses and measures the delay until the reflection of the respective light pulse arrives. Via the measured delay of the reflection, the distance between the scanned point and the sensor unit can be estimated.

The more scans there are taken per time unit, the more accurate the measured distance or the monitoring of the passenger compartment will be.

The resolution of the scan should be great enough to accurately recognize even the smallest objects that are to be detected. For analyzing the results, the sensor unit contains an evaluation unit with a computer/processor and the appropriate software. As an alternative, the evaluation unit can also be arranged externally of the sensor unit, for example in the driver compartment of a train.

The sensor unit should be placed such that the passenger compartment can be optimally scanned and that no unwanted elements protrude into the scanner rays. While these could be ignored by the sensor unit, they are creating a shadow. In case of two-wing doors, the middle position above the two door wings, i.e. in the area where the main closing edges butt together, has proven to be particularly advantageous. From this raised position, the point cloud is radiated downward.

According to the disclosure, it is particularly advantageous to install the point cloud in the middle above the door, since this allows the passenger compartment to be optimally scanned. With two-wing doors in the inner space, an arrangement next to and above the door has proven to be particularly advantageous because with a central placement, the carrying arms of the door would limit the view of the laser scanner.

According to the disclosure, it is possible to use the inventive sensor unit to produce virtual buttons. This means that it can be defined anywhere in the area where for example a hand movement of a passenger can be interpreted as the push of a button. If for example, the hand of a passenger at the position of the virtual button moves in the direction of an adhesive sticker or a marking on or next to the door of a double-door wing, the sensor unit would recognize this and release an opening or closing signal for the doors.

When such a virtual button is calibrated, an object is held against the point cloud at the desired place where the virtual button is to be generated. If this object is held still long enough, and if only this one object is recognized by the scanner, the object's mid point is determined whose position is then used as the mid point for the virtual button. Since with this calibration, the speed of elements is also measured, objects that are too fast are not accepted in this area. In another step, a radius is defined around this mid point, which allows the size of the virtual button to be determined. When this virtual button is activated, the distance between all scanned objects recognized inside the passenger compartment and the mid point of the virtual button are determined. If the distance between an object such as the hand of a passenger and the mid point of the virtual button is smaller than the predetermined radius, the virtual scanner is considered activated. Preferably, for recognizing and activating, that area of the point cloud is used which is closest to the door opening. This has the effect that only movements can be recognized which extend very close to the wall of the door or to the vehicle wall. Ideally, the passengers must touch the sticker or the marking to activate the button.

The considerable advantage of such virtual buttons is that they can be positioned and installed anywhere. No additional cabling is necessary, and changes can be made anytime to the vehicle or to the position. It is also possible without a problem and with very insignificant additional costs to place several buttons in one door system. For example, it would be feasible to place additional buttons for children or wheelchair users.

When the sensor unit and the sensor surroundings are calibrated, the entire surroundings visible by the laser unit or the laser scanner are scanned and stored taking the tolerances into consideration. In addition, the dimensions of the door portal are integrated into the calibration to be able to exclude relevant objects beyond the door such as different platform heights or to adapt to possible obstacles. The sensor unit recognizes additional objects or elements inside the monitored passenger compartment without a problem.

For example, the sensor unit is coupled to the door or door wing and able to read the actual door or door wing position. The information is used to monitor the space between the door wings, and the surroundings can be ignored in this application. If there is only one door, the area immediately inside the door frame or the gap between the main closing edge and the door frame is being monitored.

According to the disclosure, it is also possible to monitor the space between the door wings, independently from the control of the door or door wing or the derived door position or door wing position, exclusively with the help of the sensor unit.

It has been found that according to the disclosure—especially when the data from the control of the door or door wing are used—an area in front of the door opening should also be scanned. This is necessary because the reading from the door position or door wing position based on the door control is often imprecise and subject to error. There can be deviation between the position given by the encoder of the door's drive motor and the real position of the main closing edges of the door wings. In addition, a deformation of the door rubber in the area of the main closing edge can leave a gap large enough for small objects such as dog leashes or even fingers, and these gaps are not monitored. Gaps are only monitored when the area immediately in front of them, i.e. in front of the door or the door wings is scanned. This point cloud in front of the door opening preferably overlaps with the door wings.

In a further development of the disclosure, it is taken into account that the virtual button—especially at busy stations—can become obscured by large objects and therefore cannot be used. The sensor unit takes that into account, and according to the disclosure, it will give the warning via the communication element. Such a warning may address the immediately affected passenger directly at the respective door, for example by speaker, or it may first be given to the driver or conductor who may then relay it to the passenger.

To avoid that passengers standing in front of the vehicle are injured by opening doors or door wings, the disclosure provides that the relevant area within range of the moving door is also monitored by the sensor unit. If objects are detected within this range, a signal is generated that can, for example, be used to stop or reverse the door or door wing. Advantageously it is also possible to generate a signal before the door opens that could be used to warn the passengers.

The inventive door system and process can also be used to recognize extremities and their position and speed. By using one or more point clouds, the speed of a movement in the direction of the door opening or away from the door opening can be detected.

These data serve to draw conclusions about the intention of a passenger, for example an intention to open a door or to gain access.

According to the disclosure, it is even possible to detect and utilize the flow of passenger movement in the area of the doors. In practice, it is often customary to use certain doors either only for de-boarding or only for boarding. By recognizing a passenger's movement direction, a door can be blocked or opened to move the passenger flow in a certain direction. If for example a passenger in the permitted movement direction has passed the door, and another passenger follows, the door can be closed directly to make it difficult for passengers to pass the door in the opposite direction. If a passenger moves toward this door in the wrong direction, this door can be closed more quickly to prevent its use in the wrong direction, provided that no one stands in the vicinity of the moving door or wishes to de-board. Preferably, a space in front of the door opening is also monitored with this kind of application, and this space can, for example, extend up to 10 m, preferably 2 to 5 m from the door in the direction of the platform or street. Thus, passengers are recognized early, and an early reaction is possible.

The disclosure is also suitable for interaction between the door system and passengers, for example by using a speaker and/or monitor in the area of the door. Scanning the passenger compartment facilitates providing passengers with context-based information or to warn them of dangerous situations. For example, when a passenger is leaning against a door or a door wing from inside, while they are to be opened, the passenger can be warned. The same applies to a disturbing object leaned against the door. The door can be kept closed until the potential danger has been removed.

A similar case applies when a passenger obscures a virtual button. In that case, the passenger can be instructed via speaker or monitor or other signal to change position to allow the button to be used again.

Even when a passenger or an object is too close outside an opening door, a warning can be given, and the door opening can be held back until the area is free of obstacles. Advantageously persons can be spotted who are standing on a boarding aid such that its retraction can be prevented or stopped.

A considerable advantage in the above named application is that a passenger must not have contact with a moving door before its opening or closing process is interrupted and/or reversed. With prior-art sensors, which are connected to the main closing edge, the passenger must have touched or even pushed in the closing edge or even pushed in the main closing edge before a signal is generated. Such a contact is often perceived as unpleasant and can also soil a passenger's clothes. These disadvantages are effectively avoided due to the touch-free scanning of the relevant passenger compartment.

The inventive embodiment of the door system or the inventive process of monitoring the passenger compartment allow further advantageous monitoring and control possibilities. For example, if a door is marked "defective" and a passenger approaches this door, the passenger can be advised about the status of the door via the communication means such as the speaker system. This is an advantage because it is known that passengers often disregard notices of defects in the form of stickers or only notice them when they see that the door does not function. Traffic can be speeded up and made easier when passengers who prevent a door from closing because they are standing too close are asked to stand back even before the door closes. With prior-art sensor systems, passengers are asked by the driver of the vehicle only when the driver notices the door's malfunctioning, for example, when it cannot be closed. Such situations are avoided when the position of passengers is recognized beforehand.

According to the disclosure, it is even possible to recognize a bicycle next to a passenger and to examine directly whether a place is available for it near the entrance selected by the passenger. The passenger can be informed accordingly via the communication system, for example given an indication that he should perhaps try an alternative entrance door.

It is also possible to inform boarding passengers as to the degree of crowding and especially the availability of seats in a certain car, and to tell them via the communication system in which car seats are still available.

In principle, it is possible with the inventive door system and the inventive process to inform the driver of the vehicle about the movement and use of doors, to allow for their optimal control. In particular, unused doors can be closed earlier or automatic doors can be released earlier where passengers are waiting to de-board. In heated or air-conditioned cars, it is an advantage when doors can be closed as early as possible. With prior-art systems, drivers can only control passengers on a platform or at a stop when they look in the rear-view mirror, thus depending on the driver's concentration and ability to pay attention.

According to the disclosure, three-dimensional scanning outside the vehicle can be used to recognize and report a layer of snow that has formed, for example on a tread.

According to the disclosure, it is also possible to determine the distance between the door opening and the platform and therefore to optimally fold out the tread or boarding aid. This is a particular advantage when this distance varies from one station to another.

This can eliminate the need for sensors on the boarding aids themselves.

By using three-dimensional scanning, not only the speed but also the number of passing passengers can be determined, and the number of passengers can be counted without a problem.

With the aid of appropriate algorithms, the shape and movement of passengers and objects can be approximated. Thus, objects such as suitcases can be differentiated from passengers.

BRIEF DESCRIPTION OF THE DRAWINGS

The inventive door system will be described in detail with reference to the following figures. These are to be understood only as first embodiments, and the disclosure is not limited to these. The drawings are not to scale, where.

DETAILED DESCRIPTION OF THE DRAWINGS

Figure 1:
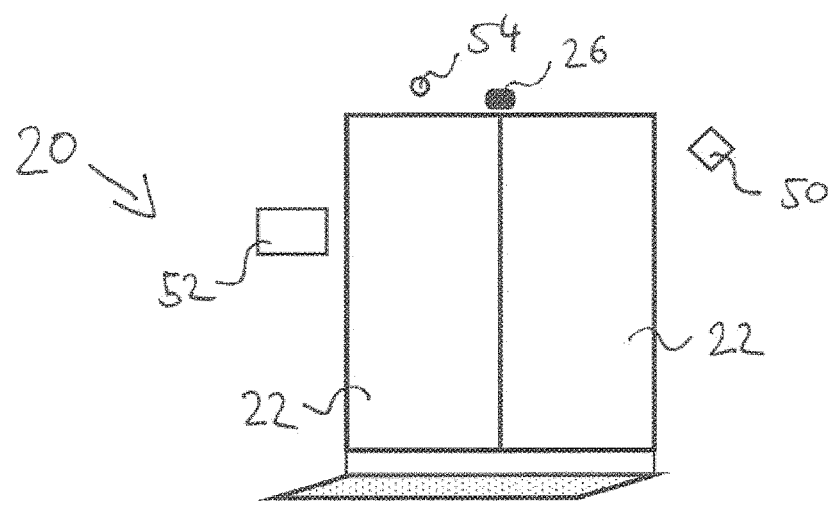
FIG. 1: An inventive door system from the outside is shown as a simplified schematic view.
Figure 2:
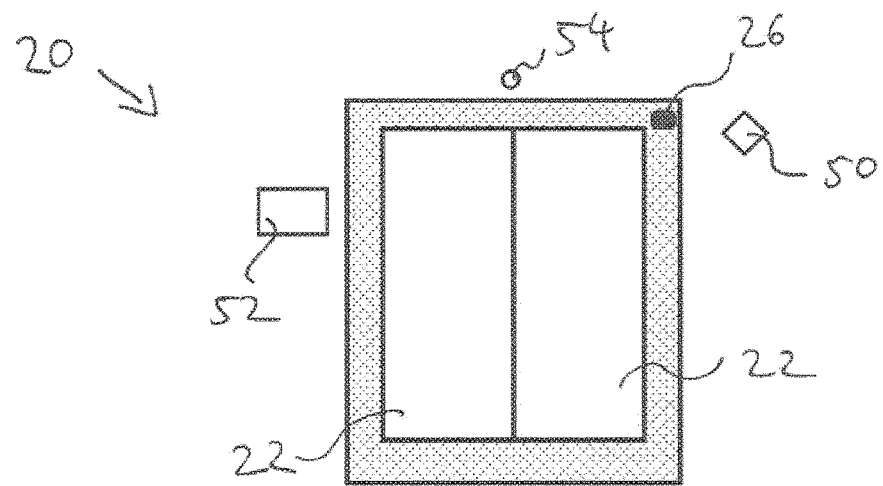
FIG. 2: An inventive door system from the inside is shown as a simplified schematic view.
Figure 4:
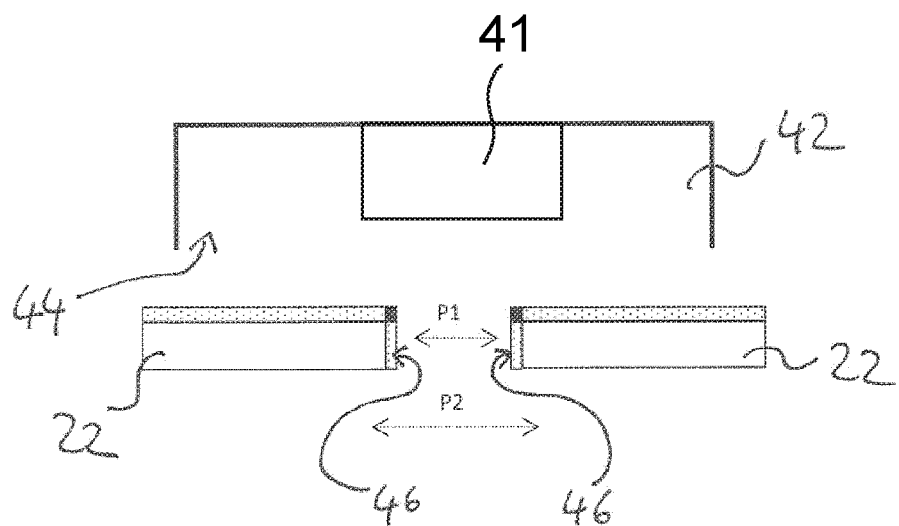
FIG. 4: A schematic sketch shows the monitoring of obstacle between two door wings.

FIGS. 1 and 2 show a greatly simplified schematic view of door system 20 for a public transit vehicle 42 having a passenger compartment 41 (see FIG. 4). It comprises a door opening 44 (not shown in FIGS. 1 and 2), which in the embodiment shown can be closed by a door with two wings 22. Below the door, a boarding aid 24 is installed which is to help passengers to board and de-board the vehicle. For example, this boarding aid 24 can be designed as a foldout tread step or tread plate.

Both figures also show a sensor unit 26. This is placed on the outside of vehicle 42 in the middle above door wings 22. On the inside of vehicle 42, the sensor unit 26 is positioned laterally above the two door wings 22, since otherwise the carrier arms (not shown) might limit the view of sensor unit 26. In principle, the sensor unit 26 can be placed in any suitable position, depending on the type of sensor.

The sensor unit 26 generates a point cloud inside the passenger compartment 41 to be monitored, via which the passenger compartment is scanned. For this, the sensor unit 26 can for example comprise an optical sensor, preferably a laser, in particular an infrared laser.

Furthermore, the sensor unit 26 comprises an evaluation unit (not shown) to evaluate the readings. This unit can be integrated in the sensor unit or placed externally.

Furthermore, FIGS. 1 and 2 symbolically show different varieties of communication means, namely a speaker 50, a monitor 52 and a light 54, all placed in the area of the door opening 44.

Figure 3:
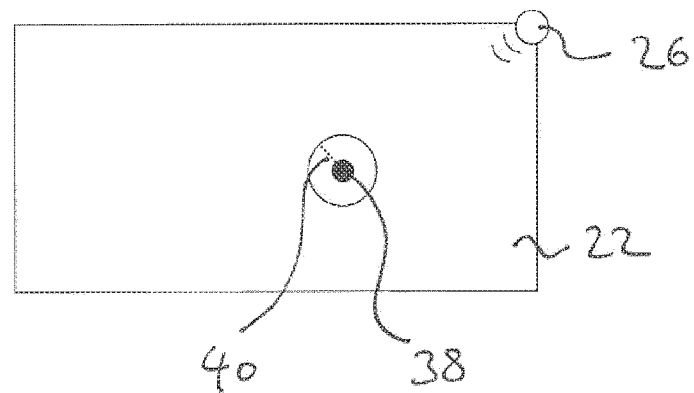
FIG. 3: A schematic sketch shows the function of a virtual button.

FIG. 3 shows the use of the inventive door systems 20 to create a virtual button 36. A virtual button 36 simulates a real button that would be wired. To tell passengers where this virtual button 36 is placed, an adhesive sticker or a painted symbol may indicate the location in the door area.

When such a virtual button 36 is calibrated or placed, an object is held against the point cloud in the desired position of the virtual button 36. If it is held still long enough, its position can be used as midpoint 38 for the virtual button 36. In addition, a radius 40 is determined and entered in the associated evaluation software. If for example a hand of a passenger approaches the virtual button 36 through the point cloud within the defined radius 40, this movement is interpreted as the passenger's intention to push it. However, alternatively to the passenger's hand, any object in this area is accordingly recognized and taken into account.

FIG. 4 shows another example of using the inventive door system 20. Shown is an implied vehicle 42 with a door opening 44. In front of it are two door wings 22 in slightly opened position. A first point cloud area P1 monitors a space between the two door wings 22 and is limited to these, ignoring the other surroundings. A second point cloud area P2 scans the space immediately in front of the door wings 22 and is somewhat wider, thus overlapping the expanse of the door wings 22. If there is an obstacle in the monitored or scanned spaces, it is securely recognized, and the closing or movement of the door can be interrupted; or the door may be automatically reversed. The point cloud area P1 thus monitors a space between the main closing edges 46 of the two door wings 22. For a single door, the same principle can be used; in that case, the space between the main closing edge 46 of the only door and the door frame is monitored.

The disclosure is not limited to the described and depicted embodiments; instead, other applications of the inventive door system 20 are possible. For example, instead of a laser scanner, optical imaging can be used for monitoring, in which case an appropriate evaluation software evaluates movement, shape and speed.

For example, the use of a video camera is possible with a respective evaluation program. Communication with passengers is possible not only via a speaker system, but also via monitors or other optical signals such as warning lights. Of course, instead of door openings 44, passages or windows can also be monitored by means of the described process. The disclosure is also suitable in conjunction with other sensor elements such as ultrasound sensors. Furthermore, the sensor unit 26 can be designed and oriented such that not only the passenger compartment is monitored in the area of the door opening, but also for example a clearly larger area can be included for monitoring on the outside of the vehicle 42. This facilitates the early recognition of crowds and their direction, and to react to them by opening or closing doors. The passenger compartment can be monitored only on the outside, only on the inside, and preferable on both sides of the door.

It can also be provided according to the disclosure that the sensor unit 26 or the assigned evaluation unit is in connection with an external display. For example, this can be placed with the driver or at a control centre, preferable at a station or near a stop where the results generated by the sensor unit 26 can be evaluated and further processed.

The invention claimed is:

1. A door system for a public transit vehicle comprising: a passenger compartment with at least one door opening and a door that closes the door opening, wherein a laser scanner unit scans the passenger compartment in three dimensions and contactless, the laser scanner unit includes an evaluation unit, whereas
   the laser scanner unit is coupled to the door or a door wing and is configured to read the door or door wing position,
   the laser scanner unit measures distances on a basis of a transmitted point cloud in which a delay of a reflection of a pulse is evaluated,
   a space through which the door or the door wing moves is monitored by the laser scanner unit to prevent injury, whereby the opening movement of the door or the door wing is interrupted when an obstacle is disposed in that space.

2. The door system according to claim 1, wherein the passenger compartment comprises an interior space of the vehicle or an external space outside the vehicle.

3. The door system according to claim 1, wherein two door wings are provided, and the laser scanner unit monitors a space between a first closing edge and a second closing edge of the two door wings to recognize obstacles.

4. The door system according to claim 1, wherein the laser scanner unit is placed and oriented such that in addition, a space outside the vehicle is scanned which extends from the door opening up to 5 m.

5. The door system according to claim 1, wherein a speaker is provided via which a context-based communication is possible with passengers on the basis of a plurality of readings from the laser scanner unit.

6. The door system according to claim 1, wherein a data connection exists to an externally installed display device.

7. A process for monitoring and controlling a door system of a public transit vehicle having a passenger compartment, the process including the following steps:
   contactless and three-dimensional scanning of the passenger compartment in an area of a door opening with a laser scanner unit on a basis of a transmitted point cloud in which a delay of a reflection of a pulse is evaluated,
   measuring of distances, shapes, and movements of objects by evaluating a plurality of readings from contactless and three-dimensional scanning,
   monitoring a space through which a door or a door wing moves by the laser scanner unit to prevent injury, whereby the opening movement of the door or the door wing is interrupted when an obstacle is disposed in that space, and
   reading the door or the door wing position with the laser scanner unit to monitor the space between the door wing.

8. The process according to claim 7, wherein speed in which objects move is also determined.

9. The process according to claim 7, wherein direction in which objects move is also determined.

10. The process according to claim 7, wherein a door for closing the door opening is closed when the laser scanner unit does not recognize any objects in the passenger compartment, which move in the direction of the door.

11. The process according to claim 7, wherein the laser scanner unit determines a distance between the door opening and a platform, and that the plurality of readings are used for controlling the extension movement of a boarding aid.

12. The process according to claim 7, wherein boarding and de-boarding passengers are being determined and counted, and in that information is given to passengers based on a rate in which the vehicle is being filled.

13. The process according to claim 7, wherein the laser scanner unit scans the boarding aid whereby, when obstacles are determined, an appropriate information is given to the passengers.

* * * * *